US012596771B2

(12) United States Patent
Pathirana et al.

(10) Patent No.: US 12,596,771 B2
(45) Date of Patent: Apr. 7, 2026

(54) SECURE ENFORCEMENT OF DIGITAL RIGHTS IN ARTIFICIAL INTELLIGENCE MODELS

(71) Applicant: Microsoft Technology Licensing, LLC, Redmond, WA (US)

(72) Inventors: Isuru Chamara Pathirana, Seattle, WA (US); Marcin Maciej Stankiewicz, Redmond, WA (US); Kumar Rajeev, Redmond, WA (US); Glenn F. Evans, Kirkland, WA (US); Priya Rakesh Patel, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

(21) Appl. No.: 18/888,556

(22) Filed: Sep. 18, 2024

(65) Prior Publication Data

US 2025/0272363 A1     Aug. 28, 2025

Related U.S. Application Data

(60) Provisional application No. 63/556,736, filed on Feb. 22, 2024.

(51) Int. Cl.
*G06F 21/00*        (2013.01)
*G06F 21/10*        (2013.01)

(52) U.S. Cl.
CPC ........ *G06F 21/107* (2023.08); *G06F 21/1074* (2023.08); *G06F 21/108* (2023.08)

(58) Field of Classification Search
None
See application file for complete search history.

(56) References Cited

U.S. PATENT DOCUMENTS

2022/0019663 A1 * 1/2022 Stapleton .............. G06F 21/554
2025/0272414 A1    8/2025 Kumar

FOREIGN PATENT DOCUMENTS

WO    WO-2024000571 A1 *  1/2024    ......... H04L 63/0435

OTHER PUBLICATIONS

Birkholz, et al., "Remote attestation procedures (RATS) architecture." RFC 9334, Retrieved From: https://www.ietf.org/rfc/rfc9334. html, Jan. 2023, 46 Pages.

(Continued)

*Primary Examiner* — Andrew J Steinle

(57) ABSTRACT

Aspects of the technology disclosed herein related to a distributed architecture for securely delivering AI models and/or training data sets to client devices for local use. The distributed includes a licensing server that controls access to and decryption of the models. The licensing server controls the distribution of licensing packages for the different models delivered by the distribution server. The client device transmits a license request to the licensing server. The licensing request may include device-level details about the client device itself, and such details may be provided in a secure, trusted manner, such as through a hardware root of trust (HROT) of the client device. If the details in the license request satisfy the security requirements for the model, a license package for the model is delivered to the client device. The license package includes a license for the model and a decryption key for the model.

20 Claims, 10 Drawing Sheets

(56) References Cited

OTHER PUBLICATIONS

Evans, Glenn, "AI Model distribution and protection", Rev 0.2, Dec. 8, 2023, 10 Pages.

"Content Protection in Silverlight" Corporation Microsoft, Retrived from internet URL: https://download.microsoft.com/download/2/E/F/2EF96D4D-B5E7-489F-8D6C-C89ED5660658/Content_Protection_in_Silverlight_v1_FINAL.pdf, Apr. 30, 2010, 13 pages.

International Search Report and Written Opinion received for PCT Application No. PCT/US2025/012275, mailed on May 8, 2025, 24 pages.

* cited by examiner

SECURE ENFORCEMENT OF DIGITAL RIGHTS IN ARTIFICIAL INTELLIGENCE MODELS

CROSS-REFERENCE TO RELATED APPLICATIONS

This application claims the benefit of U.S. Provisional Application No. 63/556,736 filed Feb. 22, 2024, entitled "Secure Enforcement of Digital Rights in Artificial Intelligence Models," which is incorporated herein by reference in its entirety.

BACKGROUND

Artificial intelligence (AI) and machine learning (ML) models (collectively referred to herein as AI models or models) are being rapidly developed and leveraged for cloud applications. Recently, there has also been a continued push to be able to able run such models on client devices. For instance, recurrent neural networks and even some large language models (LLMs) are being operated on client devices. The ability to run such models directly on a client device potentially reduces bandwidth and increased accessibility. However, such capabilities also raise security concerns for improper use or copying of the AI models.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects of the technology disclosed herein related to a distributed architecture for securely delivering AI models and/or training data sets to client devices for local use. Model creators are able to provide encrypted versions of their models to a centralized server that in turn distributes copies of the encrypted models to a plurality of distribution servers. When a request for a particular model is received from a client device, the best-suited distribution server is identified to deliver the model. The best-suited distribution server may be the one with the lowest latency between it and the requesting client device. Such architecture allows for a highly performant distribution of models in a manner that can have low latency and high bandwidth even with large amounts of requests across the globe. The models stored within the servers may also be varied to serve the needs of many different types of client devices. For instance, the models may range in size, resolution, and/or other performance attributes that may be better suited for different client devices ranging from mobile devices to high-performance desktops or on-premises specialized devices. In some examples, the client device may provide only a certain set of protections for the model, thereby limiting which models are permitted to run on the client device.

The distributed architecture further includes a licensing server that controls access to and decryption of the models. The licensing server controls the distribution of licensing packages for the different models delivered by the distribution server. When a client device looks to locally execute a particular model received from the distribution server, the client device transmits a license request to the licensing server. The licensing request may include further device-level details about the client device itself, and such details may be generated in a secure, trusted manner, such as through a hardware root of trust (HROT) of the client device. The licensing server compares the details in the license request to security requirements of a license for the corresponding model. If the details in the license request satisfy the security requirements, a license package for the model is delivered to the client device. The license package includes a license for the model and a decryption key for the model. The license and/or license package may be digitally signed and/or include a MAC (or secure hash) to help avoid tampering.

The license for the model may also include additional performance and/or usage restrictions for the model that are to be enforced by the client device, such as by the HROT. The performance restrictions may include restrictions on the resolution of the model, the size of the input data for the model, and/or the rate of output of the model, among other restrictions. The usage restrictions may include a usage count, a usage time, a usage credit, and/or a concurrent-use limit, among others.

The security requirements of the license for the model may be set or customized by the model creators via the licensing server. Accordingly, custom security enforcements is provided that can be separated from the model distribution itself. The resultant system provides for high availability of both the model delivery and the license packages.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings.

DETAILED DESCRIPTION

Figure 1A:
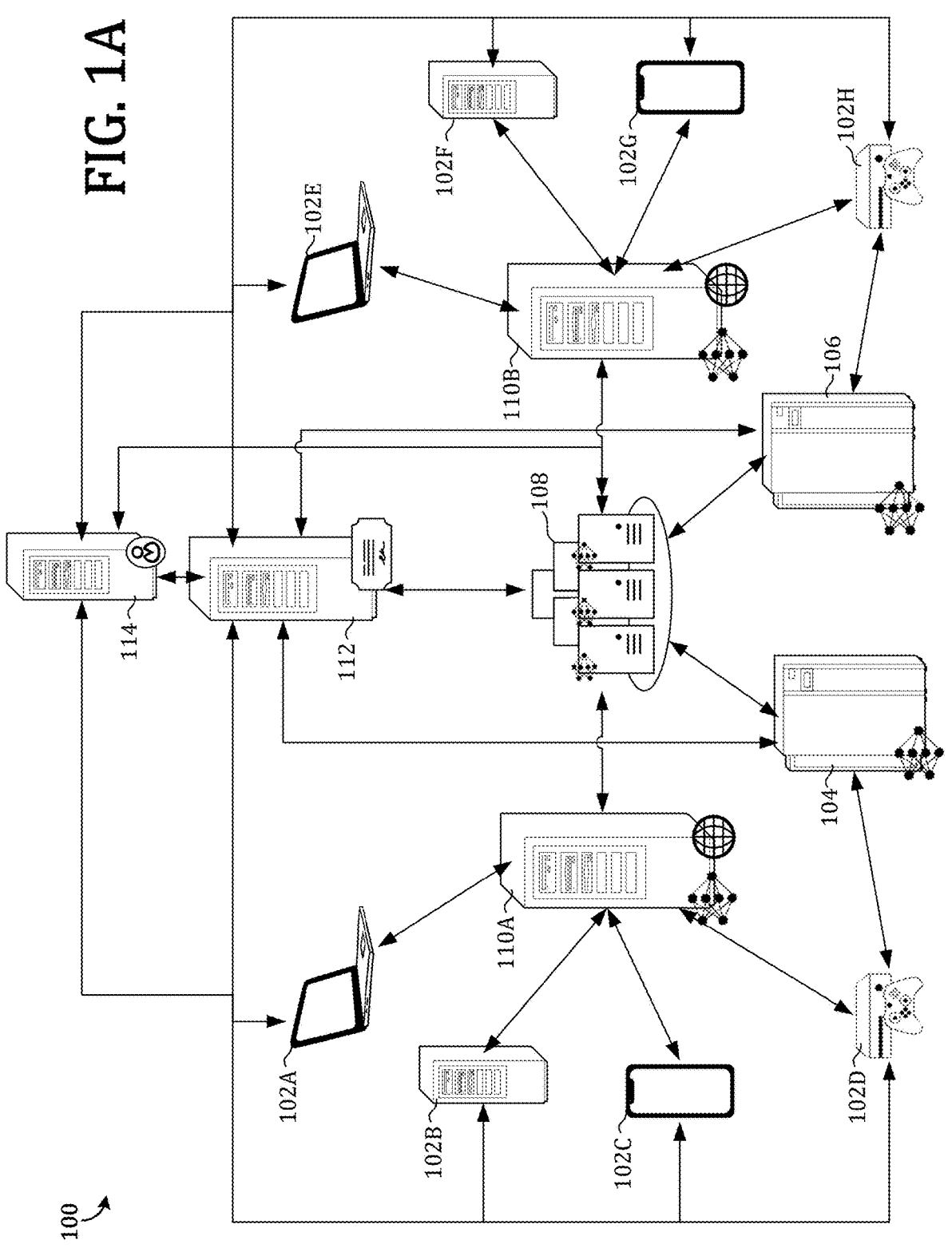
FIGS. 1A-1B depict an example system for implementing the distributed AI-model security architecture discussed herein.

The following detailed description refers to the accompanying drawings. Wherever possible, the same reference numbers are used in the drawing and the following description to refer to the same or similar elements. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the technology, but instead, the proper scope of the technology is defined by the appended claims. Examples may take the form of a hardware implementation, or an entirely software implementation, or an implementation combining software and hardware aspects. The following detailed description is, therefore, not to be taken in a limiting sense.

As briefly discussed above, recent demand for operating AI models on client devices increases security exposure for misuse or theft of the AI models. For instance, once the AI models are on the client devices, the owner of the client device may be more easily able to access or copy the model data and/or reverse engineer the model architecture and/or weights. Such potential theft is also of growing concern as the AI models being generated are continuing to increase in value. The models are being developed using proprietary algorithms and trained using vast computing resources and training data. Curation of the training data sets themselves can require significant investments as well. As a result, the AI models, and even the training datasets, can be worth millions if not hundreds of millions of dollars.

The technology disclosed herein provides for a distributed architecture for securely delivering AI models to client devices and continuing to ensure protections for those AI models once present on the client devices. When a model creator generates or creates a new AI model, the model creator looks to distribute that model to the client devices. The model creator also requires that security be in place so that the generated model cannot be easily copied, modified, or otherwise reproduced. With the technology described herein, the model creator is able to set forth security requirements and restrictions for the ultimate client devices through a license package that is registered with a license server. When the security requirements and restrictions within the license package for the model are satisfied, a decryption key can be presented that allows for the model to be decrypted on the client device and used for local processing of input.

In an example, the model creator (e.g., entity that develops new AI models) generates an AI model and encrypts all or parts of the model. The encrypted model is then provided to a centralized server system that may aggregate multiple types of AI models from potentially multiple model creators. The model creator also sets forth the security requirements and restrictions in a license package with a licensing server. The centralized server system may distribute the encrypted model to multiple distribution servers that are best located to the end-user or client devices (e.g., closest in a network topology, lowest latency, closest in geography). As such, multiple copies of the encrypted model exist across the multiple distribution servers. The distributed server may also aid in the raid or distributed updating or servicing of models.

When a client device desires to acquire a copy of the model, the client device is able to request the download from the most appropriate or best-suited distribution server, which may be the distribution server that is located within the closest distance to the client device (e.g., lowest latency, closest geographical distance) and/or the distribution server with the largest amount of available bandwidth to process the request. By having multiple distribution servers, bottlenecks are avoided for downloads from a single central location. Such bottlenecks are particularly important with the distribution of AI models due to the large size of the AI models, which can be in excess of tens of gigabytes. The only remaining potentially bottleneck occurs with the licensing server (or server forest), but these requests for licenses and the licensing packages that are subsequently delivered are substantially smaller and can be delivered more seamlessly at high volumes.

Figure 1B:
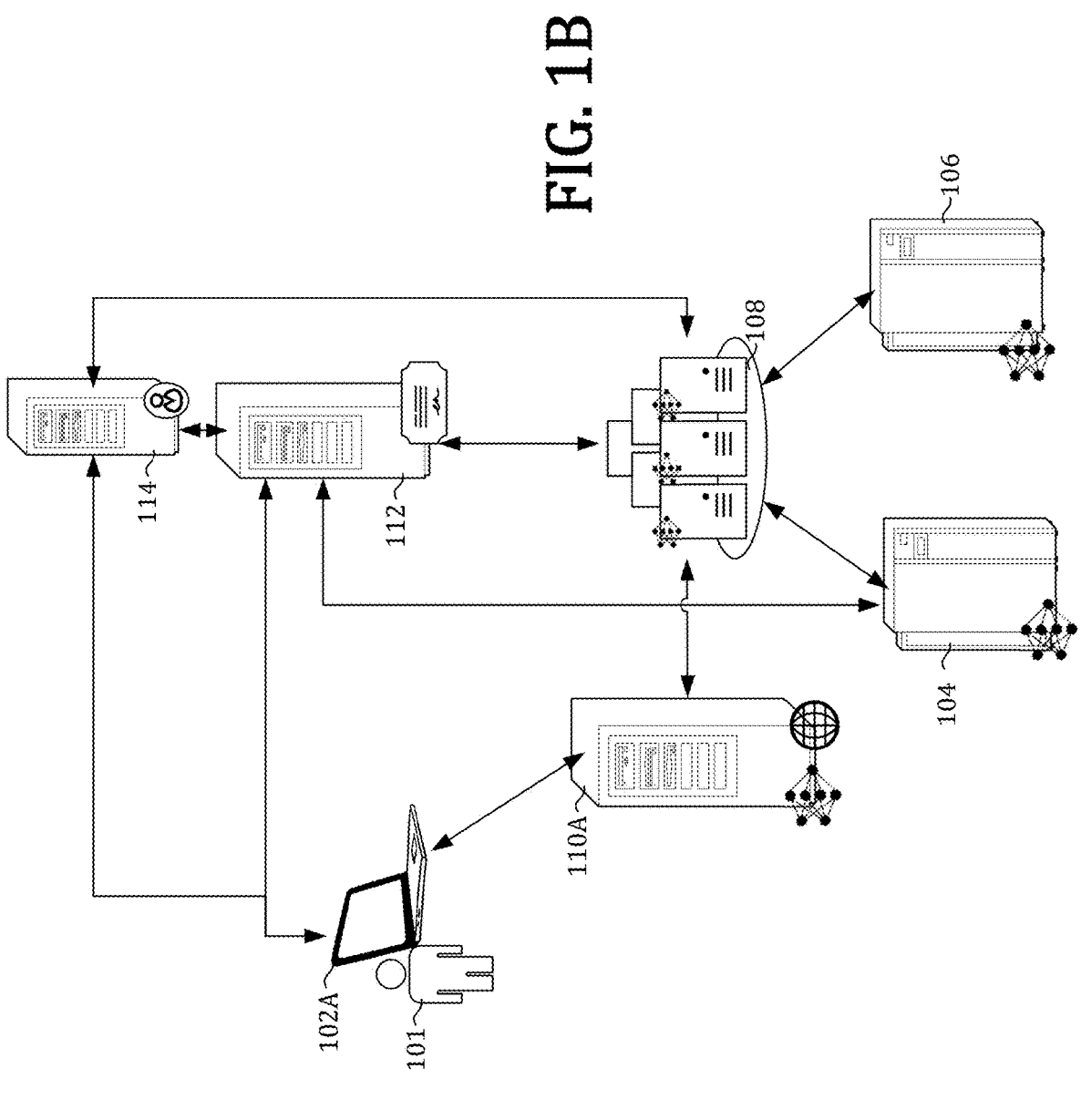

FIGS. 1A-1B depict an example system 100 for implementing the distributed AI-model security architecture discussed herein. System 100 is discussed first with reference to FIG. 1A and then a particular example of an AI model transfer is discussed with reference to FIG. 1B.

The system 100 includes a plurality of client devices 102, which are depicted as discrete client devices 102A-H. The client devices 102 ultimately receive and execute the models discussed herein. The client devices 102 may vary from many different types of devices, such as personal computers, laptops, tablets, smartphones, smart devices, gaming consoles, and even on-premises servers, among others.

The system 100 further includes a centralized server system 108 (referred to also as central server 108) and a plurality of distributed servers 110, which are shown as a first distributed server 110A and a second distributed server 110B. The system 100 also includes a licensing server 112 and an account server 114. A model creation server 104, belonging to a model creator, and a training set server 106, belonging to a training set curator, may also be included in the system 100. The central server 108 may serve as a central point to distribute the models and/or training sets to the distributed servers 110. The distributed servers 110 may be distributed in varied geographical locations, such as different cities, states, regions, countries, etc. For instance, the first distributed server 112 may be located in Colorado and the second distributed server 110B may be located in Washington. The geographical differences in the distribution servers 110 allow for some of the distribution servers 110 to be closer to subsets of client devices than other distribution servers.

When a new AI model is created by a model creator, the AI model is initially stored in the model creation server 104. The model creator then encrypts the AI model to form an encrypted model. The model creator also has access to the decryption key for decrypting the model. The decryption key may be the same as the encryption key in some examples. In other examples, the encryption key is different from the decryption key.

The encrypted model may also be compressed. The models tend to be very large in size (e.g., 1 GB or orders larger). As a result, reducing the storage and transmission size of the model is desirable. Accordingly, the model may be compressed on the model creation server 104 (and/or any other servers discussed herein that store the model).

The types of models that are created may be any type of ML/AI model, such as language models (LMs) and/or neural networks (NNs). For instance, large LMs (LLMs) and/or small LMs (SLMs) may be distributed and implemented with the technology discussed herein. Convolutional NNs (CNNs) and/or recurrent NNs (RNNs) may also be distributed and implemented. RNNs are often used for video and audio processing such as SuperResolution, camera noise reduction and processing, and/or audio microphone data enhancements (e.g. background noise removal such as music, dog barking, avatars). CNNs are often used for image processing and object detection.

The model itself may have multiple components that are encrypted differently in some examples. In an example, the model includes a network layer topology (e.g., the model code) and a model data (e.g., the model weights). These elements may be encrypted with different keys and decrypted with different keys. Accordingly, access to different parts of the model are individually controlled. This allows for additional protections of the model while the model is being stored on the various servers discussed herein. In addition, different licenses, with differing security requirements, may be associated with the different model components. This allows for further refinement of control of the model usage and distribution. In addition, different portions of differently trained models (of the same type) may be combined. For instance, the model code of one model may be combined with the model weights of another model. Thus, separate security for the different components is beneficial to prevent unauthorized combinations.

The model package may also be stored and transmitted in various different forms. One example format is container, such as an ONNX format. The ONNX model-container format allows for the model to be shared and implemented between different AI platforms and tools (e.g. DirectML, PyTorch, etc.). The ONNX data is comprised of assets (model data, weights) and the model structure (operators and functional 'code', topology). Each portion of the package may require different levels of protection due to the value of the component. In examples, the model package (e.g., ONNX container) is encrypted and/or the components within the package or container may be encrypted.

The encrypted model is then transmitted from the model creation server 104. In one example, the model creation server 104 transmits the encrypted model to the centralized server system 108. The centralized server system 108 then distributes copies of the encrypted model to the distributed servers 110. Accordingly, in the example depicted, the centralized server system 108 distributes the encrypted model to the first distributed server 110A and the second distributed server 110B.

In other examples, the model creation server 104 transmits the encrypted model directly to the client devices 102. For instance, the client devices 102 download or sideload the model more directly from the model creators. In some examples, the encrypted model is pre-installed on the client devices 102 prior to the client devices being sold. For instance, the model creation server 104 may work with the device manufacturers to include the encrypted model as part of the firmware and/or software of the client devices 102 as delivered to end users.

While only a single model, and a single model creator, have been discussed for simplicity, the system 100 handles many models of various different types from potentially many different model creators. The different models may be appropriate for different uses and/or for different types of devices. For example, the different models may be of different sizes that are more appropriate for mobile use cases versus desktop use cases. The models also have varying accuracy, with higher accuracy generally resulting in larger sizes. The different models may also have different security requirements (e.g., some models may need to be more secure than others). The different models may also have different performance attributes (e.g., mobile use cases may need results faster). Other differences between the models are also possible.

In addition to transmitting the encrypted model, the model creator also generates the security requirements for the encrypted model. The security requirements for the encrypted model are transmitted to the licensing server 112, where the security requirements are stored as part of a license package for the particular model. In addition to providing the security requirements to the licensing server 112, the decryption key for the model is also provided to the licensing server 112.

The security requirements that are incorporated into the license include device-level requirements, which may include hardware-level requirements and/or software-level requirements. For instance, a model creator may require that particular hardware security features are available on the requesting client device 102. In examples, some client devices 102 have outdated or less capable hardware, whereas other client devices have higher-end security hardware (e.g., secure memory protection hardware). Ensuring the security features are available on the particular client device 102 prior to decryption helps prevent against various different kinds of attack vectors, ranging from AI/ML-specific attacks to classical memory-scraping attacks. The security requirements may be based on particular hardware protections, central processing unit (CPU) protections, and/or output protections available on the client device 102. In examples, the security requirements also have multiple tiers or levels that correspond to the resolution at which the model is allowed to operate, with higher capabilities corresponding to potentially higher resolutions.

The security requirements and the license details can define who can use the model (e.g., user-level or account-level restrictions), what can use the model (e.g., device-level restrictions), how the model can be used (e.g., performance or usage restrictions), and/or when the model can be used (e.g., expiration periods, count limits). When a request for a license is received, details about the device are also presented so that the licensing server 112 can verify that the client device 102 meets the security requirements of the particular license.

The device-level restrictions may include restrictions on hardware or device identifiers and/or hardware manufacturers (e.g., Microsoft, Hewlett Packard, Dell). In some examples, a hardware root of trust (HROT) of the device is identified with a unique identifier by the manufacturer. These identifiers may be known by the model and/or training set creators and included within the license as a restriction, or effectively a permission list. For instance, a list of device or HROT identifiers may be included within the license as being approved to use the model (e.g., permit list). In other examples, a list of a list of device or HROT identifiers may be included within the license as being blocked to use the model (e.g., block list). In some examples, the permit or block lists may be based on device manufacturers. For instance, a model may be approved for use for all Microsoft or Dell devices.

In addition, the license may include restrictions on which organizations may use the model. For instance, the HROT may also include additional data (e.g., metadata) about organization to which the device belongs. As an example, once the client device is on premise of the organization, the organization may load organization-identifying metadata into the HROT. This organization-identifying information may then be used as a security restriction to approve devices belonging to a particular organization.

The license may also include security restrictions based on the specific hardware and/or software installed on the client device. For instance, the HROT may also include a listing of the hardware and/or software that is installed on the client device. For hardware devices, this may include NPUs, CPUs, GPUs, and memory hardware, among other hardware used in client devices. The particular memory protections, CPU protections, and hardware protections that accelerators provide may also be included as security restrictions (and provided by the HROT) The security restrictions in the license may approve use of the model for only client devices including certain sets of hardware and/or minimum hardware requirements. In other examples, the security restrictions in the license restrict usage of the model of devices with certain types of hardware. For example, a model creator may not allow a model to run on devices with a certain type of NPU and/or memory type.

The HROT may also include software capabilities of the particular client device, which may be used as security requirements in the license. For instance, certain devices may be provisioned with additional capabilities, such as the ability to process and/or decode certain types of data. As one example, some devices may have the capability to decode H.264 video streams, whereas others do not. Such capabilities may be based on purchases and/or other software licenses of the client device. For instance, a device manufacturer may produce a device with hardware that is capable of processing many different codecs, but not all of them are enabled when the device is originally manufactured. When a license to a particular codec is acquired by the client device, a software switch can be enabled to activate the decoder capabilities for the particular codec. The data identifying such enabled capabilities may be stored and/or accessed by the HROT and used as security requirements within the license for the model. Similar to the other security requirements, these capabilities may be used to grant or deny a license for the model (e.g., permit list or block list of capabilities). For instance, the license can require a check as to a hardware/software capability before the license is granted. Other hardware/software capabilities may include features such as decoding LLM models, a large amount of available memory, and/or support of certain ML operators and/or extensions, among others. By receiving this type of hardware and/or software data from the HROT, the data comes in a trusted, cryptographically hardened manner.

The license may also define performance limits that restrict the inputs and/or outputs of the model as well as the resolution of the model. For instance, tokens per second output rate may be limited or defined within the license. The input context window size may also be limited or defined within the license. The performance limits may also be tied to the device-level data (e.g., hardware and/or software of the client device). For instance, a first set of client devices have a first hardware configuration and may be granted higher performance limits, and a second set of client devices have a second hardware configuration and may be granted lower performance limits. Despite the different performance limits, both the first set and the second set of client devices are allowed to use the model.

As another example, the amount of usage of the model may be specified. For instance, a usage count may be specified in the license. The usage count limits the number of times that a model is executed. The license may also specify a usage time. For instance, a time period may be specified for how long the model is valid for (e.g., an expiration time). The license may also specify a credit amount. For instance, the credit amount may include a data processing quantity. The usage restrictions may also include a limit on concurrent uses of the model. For instance, the license may specify a maximum number of actively running models on the client device.

The license may also include restrictions related to the models and/or training data sets that can be combined and/or used together. For instance, a license for a training set may specify a list of models for which the training set may be used. This may be in addition to the types of restrictions set forth above. A license for model may similarly restrict the types of training sets with which the model may be used or modified. As such, models and the training sets with which they are used may be separately licensed (and encrypted) and control of the combination is also provided.

Similarly, because the model code and the model weights may be separately encrypted and associated with different decryption keys, they may also be separately licensed. In such examples, the license requirements for both the model-code license and the model-weights license must be met before the combination of the two may be implemented. Thus, the local combining of different model code and model weights may be controlled via the licensing architecture discussed herein.

The license for the model may also restrict changes or generation of derivates of the models. For instance, license may prevent a client device from modifying the model in any way or generating a derivative model from the locally running model.

Some of the security requirements, such as the static requirements relating to hardware and/or software present on the device, may be enforced or verified by the licensing server. Other security requirements, such as performance and/or usage restrictions, are enforced on the client device 102 itself, such as by an HROT of the client device 102.

Once the licensing server 112 has received the security restrictions or requirements and the decryption key(s) for model, the licensing server 112 then creates a licensing package for the model. The licensing package includes at least: (1) a license that defines the security requirements provided by the model creator; and (2) the decryption key(s) for the model. In some examples, the license and/or the licensing package is encrypted. The licensing package may be associated with the model via a unique identifier (UID) for the particular model. For instance, the model may have a UID and the license package may be associated with the model via the same UID such that the licensing server 112 may identify the correct license package when a request for a license for a particular model is received. The licensing package is stored for later delivery and fulfillment of license requests.

The model creator and/or the operator of the centralized server system 108 may also have account-level and/or user-level requirements for use of the model. For instance, the security requirements defined in the license may be specific to software and/or hardware requirements of the client devices 102 (e.g., device-level security requirements discussed above). The model creator and/or the operator of the centralized server system 108 may also desire to restrict usage of the models to a specific users and/or organizations. As an example, the model creator and/or the operator of the centralized server system 108 require a fee to paid to use the model and only those users or organizations with the fees paid are allowed to access the model.

These user-level requirements are transmitted to the account server 114 that manages authentication of the particular users of the client devices 102. For instance, when a request to the licensing server 112 is received a request may also be received at the account server 114 to authenticate the user of the particular client device 102. If the account server 114 is able to authenticate the user, the account server 114 provides an authentication message to the licensing server 112 indicating the identity of the user and/or whether the user is authorized to have a license to the model.

When the licensing server 112 is able to: (1) verify the hardware and/or software requirements of the license based on data received from the requesting client device 102, and (2), in some examples, receive the authentication approval from the account server 114, the licensing server 112 transmits the licensing package for the model to the requesting client device 102. The client device 102 then also performs local security verifications and operations before extracting the decryption key from the license package, as discussed further herein.

Similar system operations may also be available for specialized training-set creators. For example, as discussed above, training set curation is also a particularly expensive process and security requirements are also required for developed training sets that may be used with the models discussed herein.

Similar to the models, the training-set creator generate an encrypted training set on the training set server 106. The encrypted training set is then transmitted, such as to the centralized server system 108 and/or more directly to the client devices 102 (e.g., sideloaded, downloaded, preloaded). In examples where the training set is transmitted to the centralized server system 108, the centralized server system 108 also transmits the encrypted training set to the distributed servers 110. The distributed servers 110 then provide the encrypted training set to the client devices 102 (e.g., upon request for the training set from the client devices 102).

The training-set creator then also sets defines the device-level security requirements for the training set with the licensing server 112. The decryption key for the training set is also transmitted from the training set server 106 to the licensing server 112. The licensing server 112 creates a licensing packaging with a license defining the security requirements for the training set and the decryption key for the training set. The training-set creator may also define the user-level security requirements with the account server 114.

Then, when a request for a license to the training set is received by the licensing server 112, the licensing server 112 processes the request similarly to the request for a license to a model as discussed above. For instance, once the licensing server 112 is able to verify the security requirements for the training set, the licensing package for the training set is delivered to the requesting client device 102. The client device 102 then performs additional security checks prior to extracting the decryption key from the licensing package.

In general, many of the examples discussed herein are primarily directed to the secure distribution and access of the models rather than the training data sets. However, it should be understood that the concepts discussed herein regarding models generally also apply to distribution and access control of training data sets.

For additional clarity, FIG. 1B depicts a subset of the system 100 shown in FIG. 1A. A particular example will now be discussed with respect to the components shown in FIG. 1B.

In this example, the first client device 102A is associated with a particular user 101. The user desires to utilize a specific model created by a model creator that operates model creation server 104. The user also desires to use the specific model with a specific training set curated by an operator of the training set server 106.

To identify the model and the training set, a request is first sent to the licensing server 112 from the first client device 102A. This request may be for the specific model and/or training set and/or for a list of available models and/or training sets. As an example, the request includes the hardware and/or software details of the first client device 102A (and potentially the identity of the user 101) to the licensing server 112. The licensing server 112 then provides a listing of the available models and/or training sets for which the user 101 and/or the first client device 102A are allowed to download based on the security requirements. In other examples, the request is merely a request for models and/or training sets without identifying information about the first client device 102A and/or the user 101. In such examples, the licensing server 112 provides a list of all the available models and/or training sets that are available to be delivered from the distributed servers 110 (e.g., models and/or training sets that have been received by the centralized server system 108).

When a selection of the particular model and/or training set is received, a best-suited distributed server 110 is selected based on the first client device 102A. For instance, a distance between the first client device 102A and all the distributed servers 110 may be compared to identify one of the distributed servers 110 that is located most closely to the first client device 102A. The distance may be a physical distance and/or a network architecture distance. The distance may in some examples be based on different distance metrics, such as latency between the client devices and distributed servers, network transmission cost, etc. For instance, based on a routing map or pings between the first client device 102A and the distributed servers 110, a particular one of the distributed servers 110 is selected that is closest (e.g., lowest latency) to the distributed servers 110. In the example depicted, the closest of the distributed servers 110 is the first distribution server 110A.

A new request for the model and/or training set is then be generated from the first client device 102A and sent to the first distribution server 110A. For instance, the licensing server 112 may provide the Internet Protocol (IP) address or other identifier of the first distribution server 110A to the first client device 102A along with a UID for the model and/or training set. The first client device 102A generates a request with the UID and sends the request to the first distribution server 110A. In other examples, the licensing server 112 sends a request to the first distribution server 110A with the address of the first client device 102A and a UID of the model and/or training set to cause the first distribution server 110A to transmit the model and/or training set to the first client device 102A. In either example, the requested model and/or training set is delivered to the first client device 102A from the first distribution server 110A.

In some examples, the request for the model and/or training set also causes a request for the licensing package for the model and/or training set to be generated from the first client device 102A and provided to the licensing server 112. In other examples, an interrogation of the model and/or training data set first occurs on the first client device 102A before a request for the licensing package is generated.

The request for the licensing package may include hardware and/or software information (e.g., device-level details)

about the first client device 102A. This device data may be used for attestation and verification. For example, hardware/ software certificates, and/or other evidence, may be delivered as part of the device data. The licensing server 112 then verifies that the device data meets the security requirements set forth in the corresponding license(s).

In the current example, user-level security requirements are also required for the model and/or training set. User-identity data is provided to the account server 114. The user identity data may include a username and password as well as other verification data in some examples (e.g., dual-factor). The account server 114 and authenticates the user 101. The authentication verification is provided to the licensing server 112.

Upon verifying that the device data meets the security requirements and receives the authentication verification, the licensing server 112 provides the license package(s) for the model and/or training set to the first client device 102A. The first client device 102A then processes the license package to extract the decryption key and decrypt the model and/or training set, as discussed further herein.

Figure 2A:
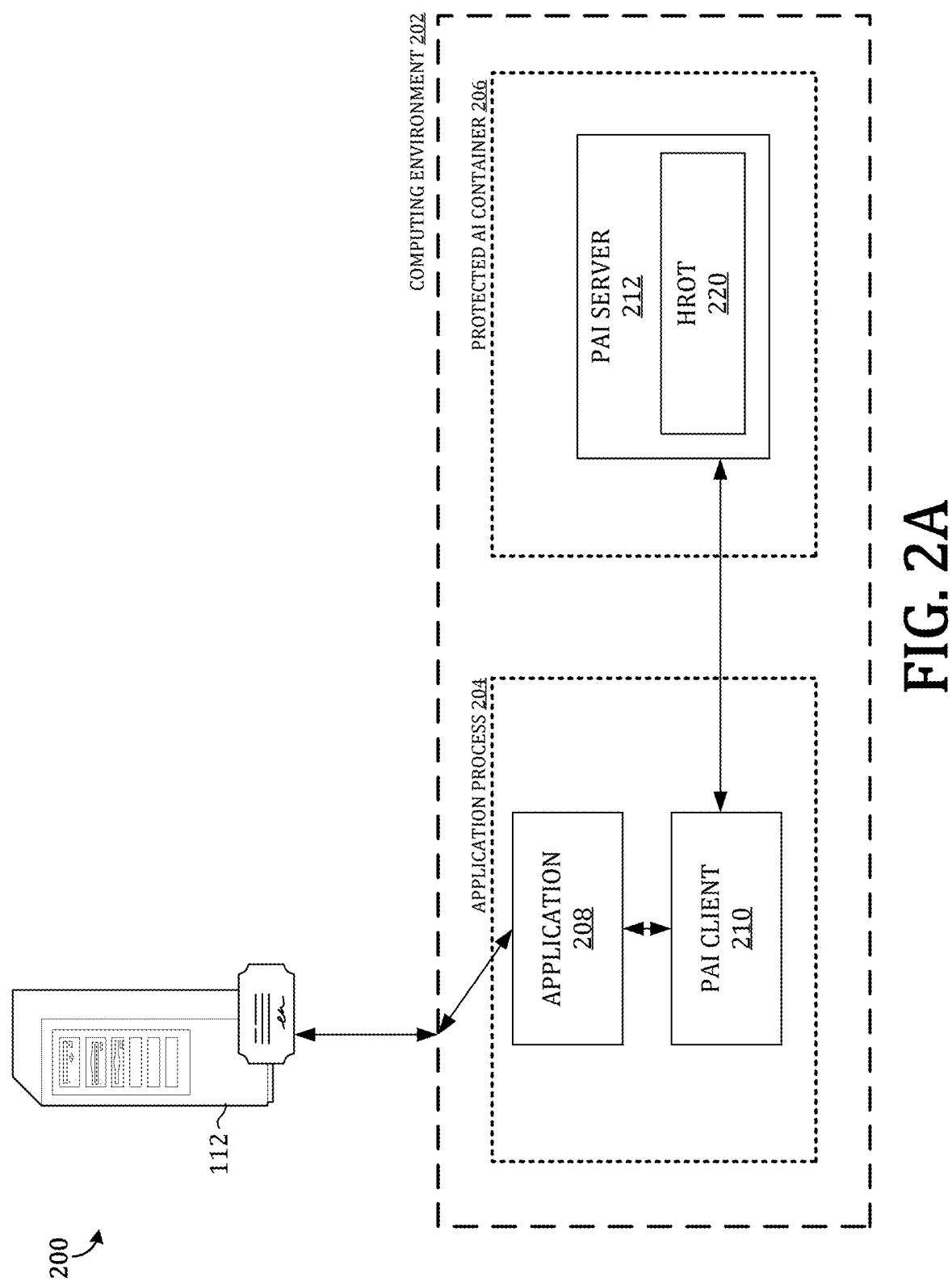
FIG. 2A depicts another example system for implementing the distributed AI-model security architecture discussed herein.

FIG. 2A depicts another example system 200 for implementing the distributed AI-model security architecture discussed herein. The system 200 includes the licensing server 112 and another computing environment 202. The computing environment 202, and/or a portion thereof, may be a client device 102. The computing environment 202 has received the model and/or training set. The computing environment includes an application process 204 and a protected AI (PAI) container 206. The application process 204 includes an application 208 and a PAI client 210. The application process 204 may also be considered a container in some examples. The PAI container 206 includes a PAI server 212.

The application process 204 and the PAI container 206 may operate on the same physical device. For instance, the PAI container 206 may be a separate, secure process from the application process 204. The PAI container 206 may also be implemented as an enclave, a virtual machine, an isolated hardware protection environment, and/or a hardware trust zone on the same device as the application process 204. For instance, the PAI container may include or be a trusted execution environment (TEE). In other examples, the PAI container 206 may be implemented as a separate device from the application process 204.

The PAI server 212 performs the operations on the model and/or training set. For instance, the PAI server 212 performs the decryption operations, validation operations, and inference (e.g., input data processing) operations. In some instances, the PAI server 212 is implemented in C++, but other formats and languages are also possible.

The PAI client 210 may operate as an interface and/or library that hides the complexity of security solution of the PAI container 206 and PAI server 212 from the application 208. The application 208 interacts with the PAI container 206 using function calls, which may be simpler function calls than required to directly communicate with the model and/or PAI server 212. The PAI client 210 may then perform the operations to communicate with the PAI server 212 and retrieve the results generated from the model. In some examples, the PAI client 210 may be part of, or include, an application programming interface (API).

A hardware root of trust (HROT) 220 exists within the PAI server 212. The HROT 220 is trusted by the licensing server 112 and can provide security data to the licensing server 112 (via the PAI client 210 and the PAI server 212). The HROT 220 is also trusted to enforce of the security requirements of the license for the model. For instance, the HROT 220 has access to the corresponding hardware components, such as the memory, the neural processing unit (NPU), the graphics processing unit (GPU), and other types of hardware that may be used by the model. The HROT 220 may also configure the memory protections (e.g., encryption to DRAM, protection of SRAM memory access) for the device to comply with the security requirements.

Hardware-based security restrictions that are enforced by the HROT 220 provide for additional security for model usage. For instance, solely tying the model security to a user account is likely not a feasible solution because the user account is an abstraction controlled by the host operating system. The hardware itself cannot be as easily changed or manipulated.

The HROT 220 may be responsible for local enforcement of the security requirements in the license, and/or a subset thereof, such as the security restrictions and/or requirements discussed above. For instance, the HROT 220 is best positioned to ensure that the usage and performance restrictions set forth in the license are enforced.

As some examples, the security requirements in the license that are enforced by the HROT 220 include permissions for particular hardware features (e.g. a video or audio codec has been 'purchased'/enabled on the machine). The amount of usage of the model can also be specified in the license and enforced by the HROT 220. For instance, a usage count may be specified in the license. The usage count limits the number of times that a model is executed (e.g., how many times a model may be used to process inputs). The HROT 220 monitors the number of times the model is executed and revokes functionality of the model once the count limit is reached. The license may also specify a usage time. For instance, a time period may be specified for how long the model is valid for (e.g., an expiration time). The HROT uses a secure clock of the PAI container 206 to monitor the time and revoke function of the model at expiration of the time period. The license may also specify a credit amount. For instance, the credit amount may include a data processing quantity. The HROT 220 monitors the processing resources consumed by the model operations (e.g., by monitoring the secure NPU/GPU processes) and revokes functionality of the model once the credit amount is reached.

The HROT 220 continues to monitor and enforce the security requirements of the license even after the initial verification. When the HROT 220 notices a condition that violates the security requirements of the license, the HROT 220 effectively revokes the local license by preventing functionality of the model from occurring. For instance, the HROT 220 can cause one or more hardware components to go into a blocked state with respect to data relating to the model. The prevention of the functionality may be related to the model directly or through control of the hardware to prevent the model from ultimately producing useful output. For instance, upon identifying a violation of the security requirements, the HROT 220 may remove decryption keys from the PAI client 210 so that the client can no longer decrypt data from the PAI server 212. The HROT 220 can also block memory access, resulting in black or null data when requests to such memory are issued.

Then, the next time communication is established between the PAI server 212 and the licensing server 112 (via the application 208 and PAI client 210), the PAI server 212 notifies the licensing server 112 that the security requirements are no longer met by the particular client. For instance, at different intervals, the licensing server 112 may be in communication with the PAI server 212 as check-in points to ensure continued compliance.

The application 208 may interact with the PAI server 212 via a web application programming interface (API). In some examples, the license may hold the decryption key for the model in a manner that is encrypted with the device certificate of the PAI server 212. The licensing server 112 may use its own certification to sign the license response that is provided to the application 208.

System 200 may also include a shared software development kit (SDK). The SDK includes the business logic, cryptographic operations, license generation, and validation data. The SDK may be used by both the PAI server 212 and the licensing server 112.

Figure 2B:
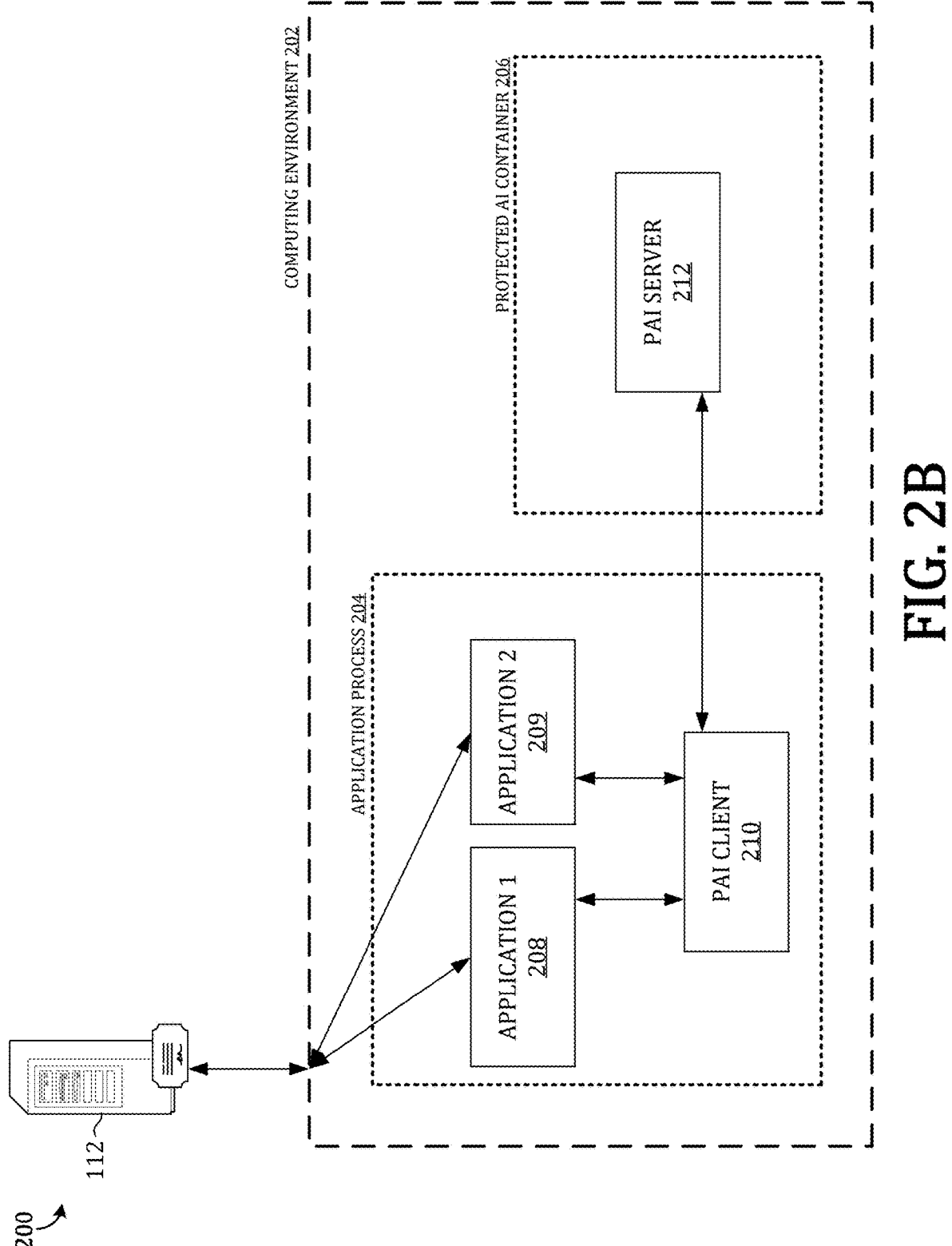
FIG. 2B depicts another example system for implementing the distributed AI-model security architecture discussed herein.

FIG. 2B depicts another example of system 200 for implementing the distributed AI-model security architecture discussed herein. The system 200 in FIG. 2B differs from the system 200 in FIG. 2A in that two applications are executing in the application process 204.

The application process 204 includes a first application 208 and a second application 209. After the model is securely installed in the PAI container 206, both the first application 208 and the second application 209 may interact with the model by sending commands to the PAI client 210. The PAI client 210 then communicates with the PAI server 212 on behalf of the applications 208-209. In this manner, the PAI server 212 and the model may remain secure while providing a single access point (e.g., the PAI client 210) for interaction with the secure model.

Figure 2C:
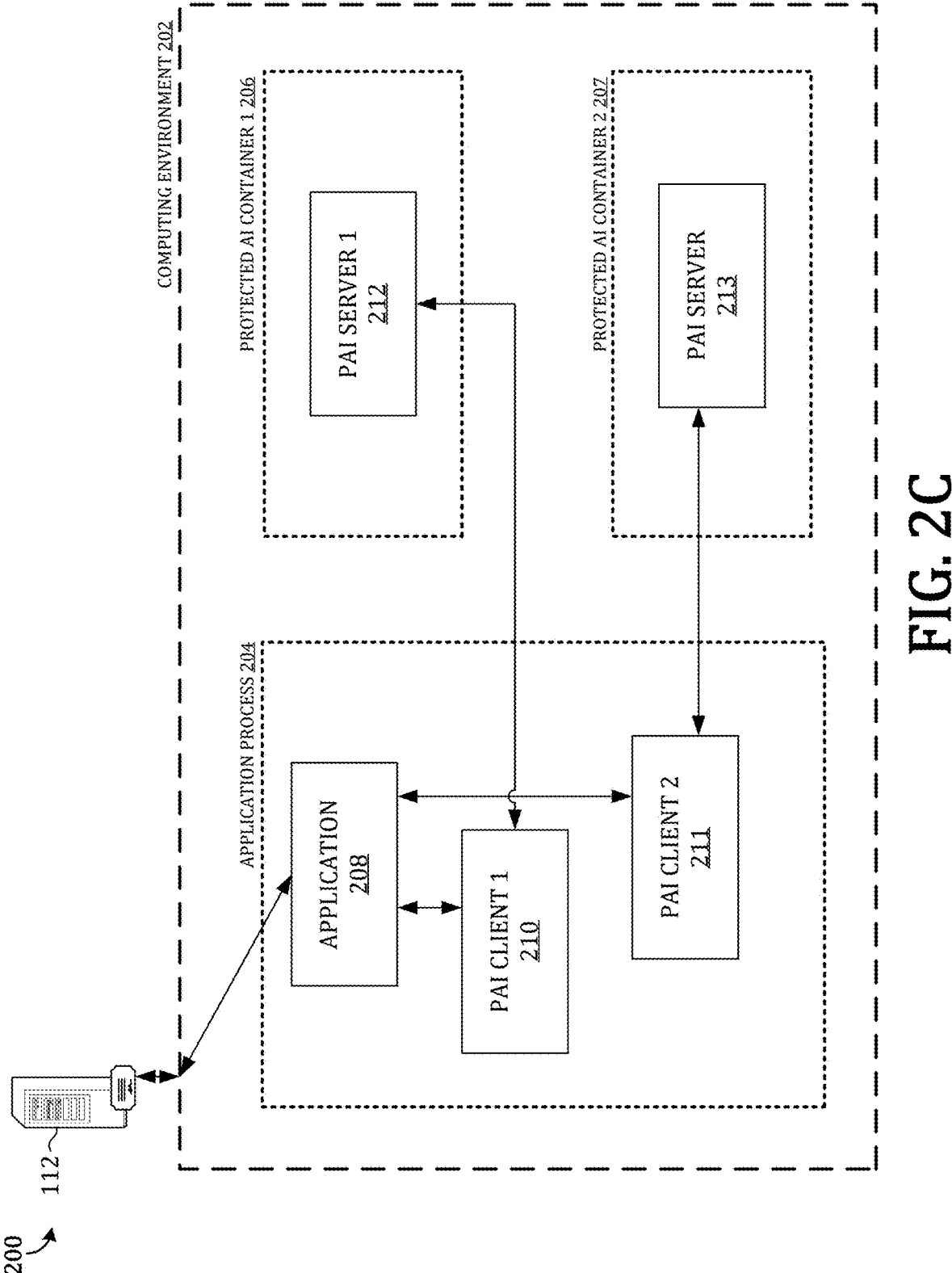
FIG. 2C depicts another example system for implementing the distributed AI-model security architecture discussed herein.

FIG. 2C depicts another example of system 200 for implementing the distributed AI-model security architecture discussed herein. The system 200 in FIG. 2C differs from system 200 in FIG. 2A in that two models are in use in the computing environment 202.

In FIG. 2C, two different models have been installed in the computing environment 202. In some examples, the models could be implemented and operated by either the same PAI server and/or in the same PAI container. However, such implementation within the same secure environment may provide a possibility for an attack vector between the models themselves within the same environment. To avoid this potential attack vector or surface, the models are instead operated in two secure environments that are separated from one another. While more secure, the inclusion of additional servers or secure containers increases cost and overhead.

More specifically, in the example depicted, a first PAI container 206 includes a first PAI server 212. The first PAI server 212 operates a first model. The application 208 interacts with the first model via the first PAI client 210, which communicates with the first PAI server 212.

A second PAI container 207 includes a second PAI server 213. The second PAI server 213 operates a second model. The application 208 interacts with the second model via the second PAI client 211, which communicates with the second PAI server 213.

In other examples, the first PAI server 212 and the second PAI server 213 may be operating two instances of the same model. This allows for the same model to be used concurrently for securely and separately processing of different input data.

Figure 2D:
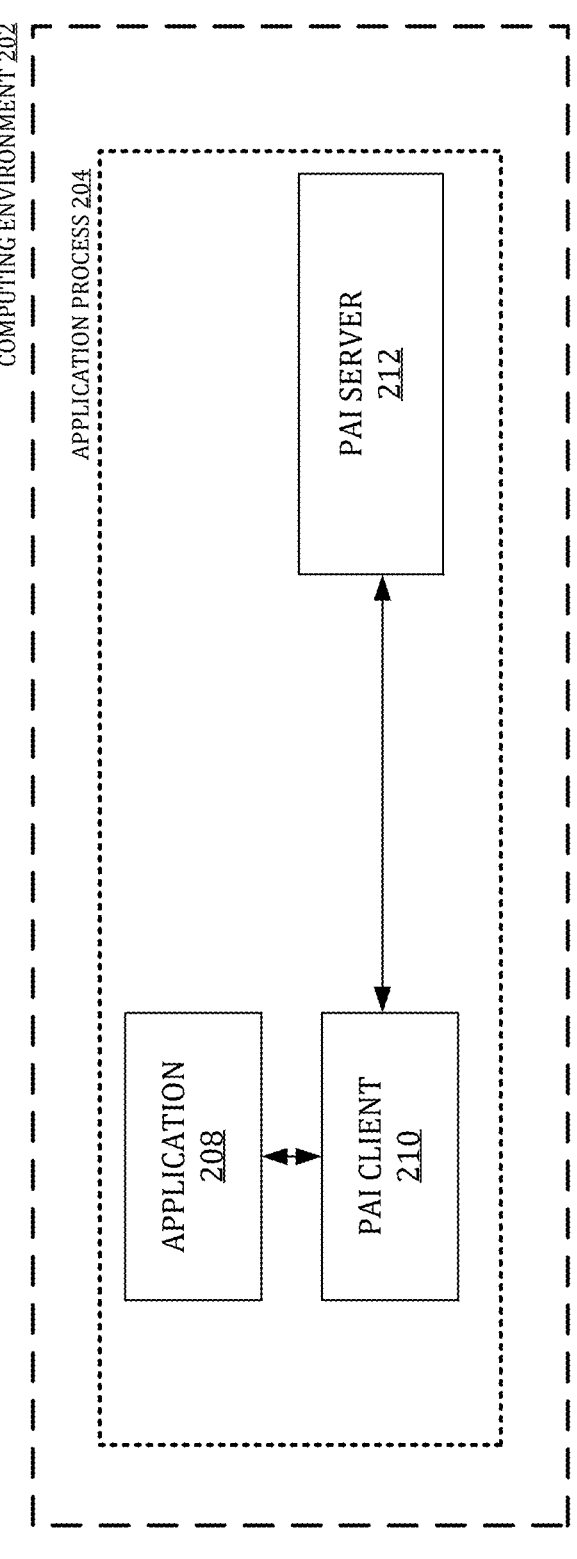
FIG. 2D depicts another example system for implementing the distributed AI-model security architecture discussed herein.

FIG. 2D another example of system 200 for implementing the distributed AI-model security architecture discussed herein. Unlike the example depicted in FIG. 2A, the example depicted in FIG. 2D is a lower-security, but less resource-intensive implementation. For instance, a license server is no longer implemented, and a PAI container 206 is also no longer implemented.

In this example, rather than retrieving the decryption key for the model as part of a license package from a license server, the decryption key is received as part of the model package when the model package is downloaded or otherwise installed in the device. The model package may also define security requirements that are to be met before the decryption key can be used. In this situation, trust is put into the client device (e.g., computing environment 202) to perform the security verifications. In some examples, the client device is able to derive the decryption key from the model package based on a secret seed and key ID value. The seed may be randomly pre-generated and stored within the application 208, the PAI client 210, and/or the PAI server 212. The decryption key may also be generated based on values read from the model (so the seed cannot be read directly from the binary). The seed and key ID are then provided as input to a key derivation function that generates the content key.

In this example, the PAI server 212 also runs within the application process 204 rather than a separate, protected application process 204. In other examples, however, the PAI server 212 may run in a separate application process 204.

Figure 3:
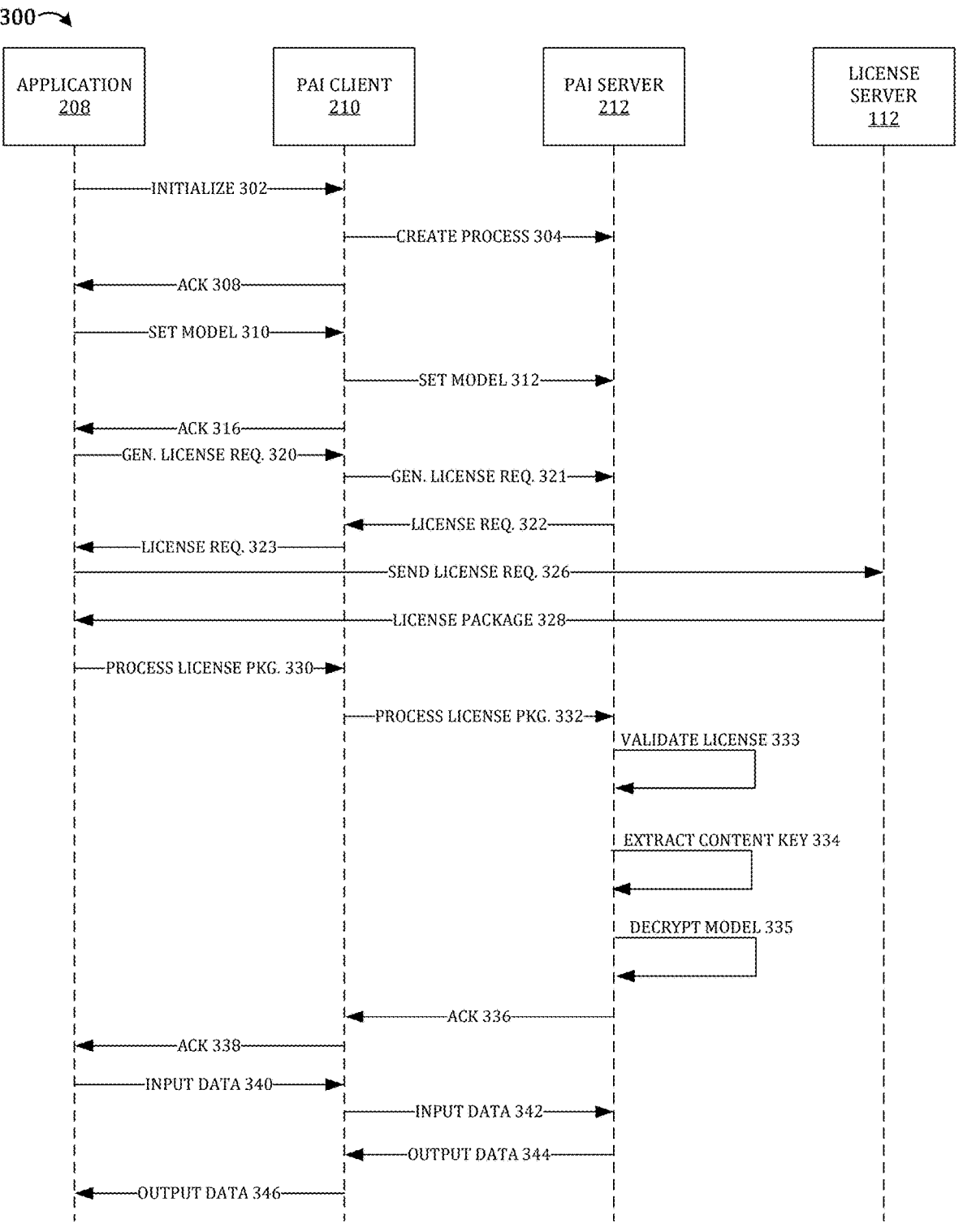
FIG. 3 depicts an example communication diagram for implementing the distributed AI-model security architecture discussed herein.

FIG. 3 depicts an example communication diagram 300 for implementing the distributed AI-model security architecture discussed herein. The communication diagram depicts communications between the application 208, the PAI client 210, the PAI server 212, and the licensing server 112, respectively. While the communications are generally described as messages below, the communications may also be considered instructions for the receiving component.

An initialize message 302 is first sent from the application 208 to the PAI client 210. A create process message 304 is then sent from the PAI client 210 to the PAI server 212. The create process message 304 causes the PAI server 212 to be created and/or the secure processes and containers associated with the PAI server 212. An acknowledgement message 308 may then be sent from the PAI client 210 to the application 208 indicating that the protected process has been created.

The application 208 then sends a set model message 310 to the PAI client 210 that may include the downloaded encrypted model package (e.g., an ONNX package including the model components). In other examples, the set model message 310 includes an indication of where the encrypted model is stored on the device (as the model has already been downloaded to the device). The PAI server 212 then ultimately causes the model to be stored in the secure memory rather than unsecure memory when the model is initially downloaded. The set model message 312 is then provided to the PAI server 212 from the PAI client 210. The PAI server 212 stores the encrypted model package in the secure memory that the PAI server 212 has access. An acknowledgment message 316 may then be generated and provided to the application to indicate that the encrypted model has been stored.

The application 208 then generates a request message 320 for a license request. This "request-for-a-request" message may be referred to herein as a GLR message 320. The GLR message 320 is then passed from the PAI client 210 to the PAI server 212 as GLR message 321. The PAI client 210 may also modify or augment the GLR message 321 for the PAI server 212.

In response to the GLR message 321, the PAI server 212 interrogates the stored model package to extract data about the model or from the model include in the license request. In some examples, the PAI server 212 also aggregates security data about the software and/or hardware of the computing environment 202, the application process 204, and/or the PAI container 206. For instance, the HROT 220 may examine the model to determine what the model requires and includes the attestation details that are likely needed by the license and/or by the licensing server 112 to approve the license request and deliver the license. As discussed above, the HROT 220 includes access to data or metadata about the hardware and/or software capabilities and/or configurations of the client device. These hardware and/or software capabilities and/or configurations of the client device (e.g., device-level data) are incorporated into the license request that is generated and passed from the PAI server 212. By generating this type of hardware and/or software data from the HROT 220, rather than from an untrusted application 208, the data is provided to the licensing server 112 in a trusted, cryptographically hardened manner. Thus, the licensing server 112 is able to make a higher-trust evaluation of the data when determining whether to grant the license for the model.

The license request that generated from the PAI server 212 may also be encrypted such that the PAI client 210 and/or the application 208 cannot read the license request itself. In some examples, the license request is partially encrypted and/or securely hashed to prevent tampering. The licensing server 112, however, includes a decryption key for the license request and can decrypt the license request upon receipt.

The license request message 322 including the data about the model (or extracted from the model) and the device-level security data (where available) is then transmitted from the PAI server 212 to the PAI client 210. The PAI client 210 sends a license request message 323 (containing substantially the same information) to the application 208.

Once the application 208 has received the license request message 323, the application 208 generates and sends a license request message 326 to the licensing server 112. The license request message 326 includes at least a portion of the data included in the license request message 323. For instance, the license request message 326 includes an identifier for model for which a license is requested. The license request message 326 may also include the device-level security data from the PAI server 212.

The license request message 326 is processed by the licensing server 112, as discussed further herein. If the licensing server 112 approves the license request, a license package 328 is transmitted from the licensing server 112 to the application 208.

The application 208 generates a process-license-package message 330 and transmits the message to the PAI client 210. The process-license-package message 330 includes the license package for the model. The PAI client 210 processes the process-license-package message 330 and transmits its own process-license-package message 332 to the PAI server 212.

When the PAI server 212 receives the process-license-package message 331, the PAI server 212 then performs operations to process the received license package. The example operations include a validate-license operation 333, an extract-content-key operation 334, and a decrypt-model operation 335.

In some examples, the validate-license operation 333 includes locally validating the security requirements set forth in the license. The validate-license operation 333 operation may also first determine that the license package received is valid, such as checking that the license package came from an approved license server and/or is associated with an approved device identifier (e.g., media access control (MAC) address).

Once the license requirements are validated, the extract-content-key operation 334 is performed to extract the decryption key from the license package. The extracted decryption key is then used to decrypt the encrypted model at the decrypt-model operation 335. The decrypted model is then stored within the secure memory to which the PAI server 212 has access. The decrypted model may then be used to locally process and analyze new input data. In examples where the model is in an ONNX model package, the model package is compiled/translated into DirectML to be executed by the GPU and/or NPU. An independent hardware vendor (IHV) driver may then translate the DirectML commands into microcode blocks with are submitted to the IHV kernel driver for execution.

Once the model is decrypted, installed, and ready for use, an acknowledgement message 336 is sent from the PAI server 212 to the PAI client 210 indicating that the model is ready for use. The acknowledgement is then passed to the application 208 as acknowledgement message 338. Based on the acknowledge message, the application 208 is aware that input data can now be provided as input for the model.

The application 208 then sends, to the PAI client 210, input data 340 for the model to process. The PAI client 210 may adjust or package the input data in some examples. For instance, in some cases the input data is translated into commands for the specific model, which may include translating into DirectML commands or similar command types. In other examples, the input data is not modified. The PAI client 210 then transmits the input data 342 to the PAI server 212. The model then processes the input data while executing in the secure PAI container 206.

The output data 344 that is generated from the model is transmitted from the PAI server 212 to the PAI client 210. The PAI client 210 may adjust and/or package the output data. In other examples, the PAI client 210 does not adjust or modify the output data. The output data 346 is then transmitted to the application process 204.

Figure 4:
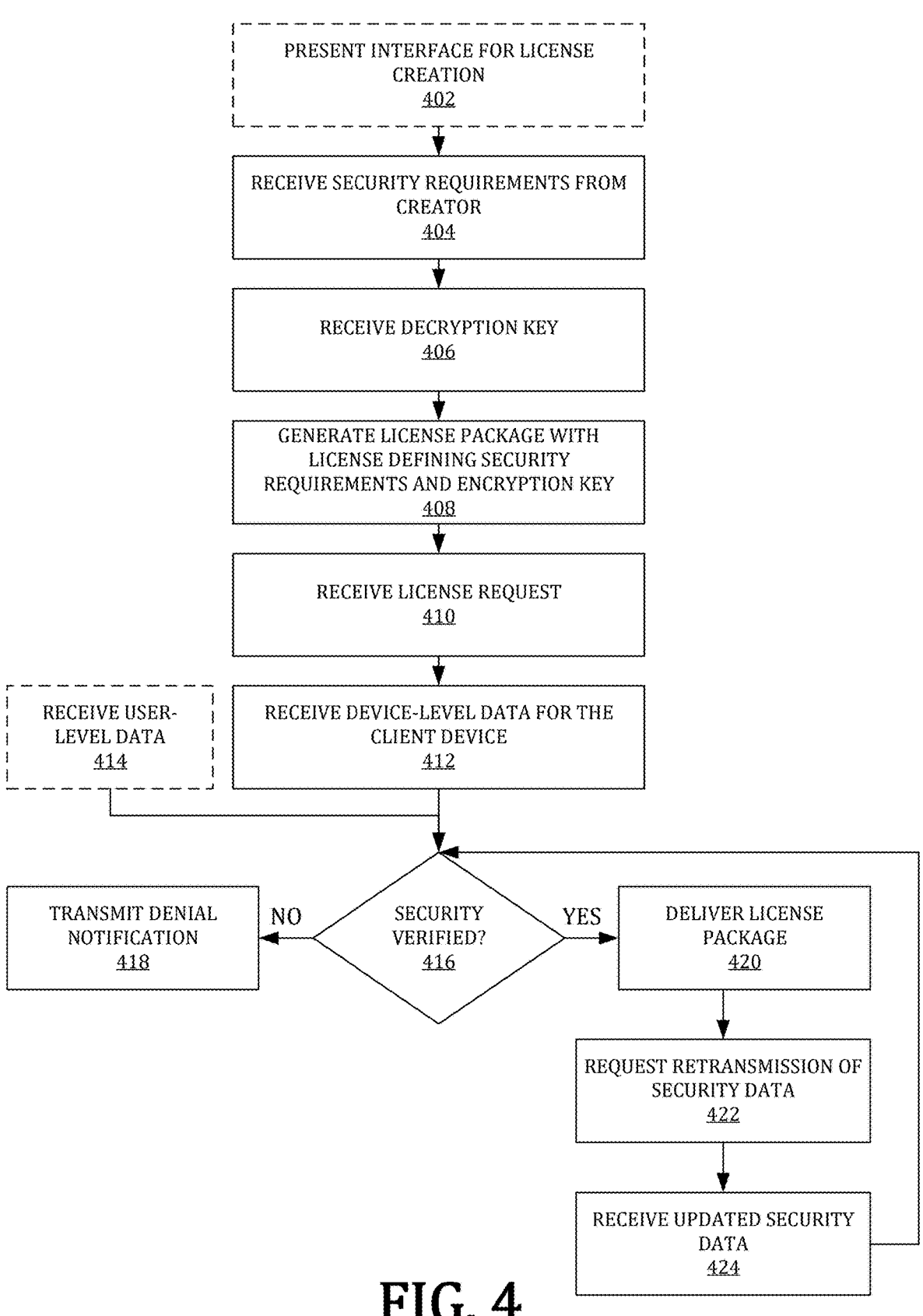
FIG. 4 depicts an example method for verifying device security and providing an AI-model license package.

FIG. 4 depicts an example method 400 for verifying device security and providing an AI-model license package. The method in example 400 may be performed by one or more of the devices or components of the systems described above. In an example, the method 400 is performed by the licensing server 112.

At operation 402, a license-creation interface may be provided or presented to a model and/or training-set creator for creation of the corresponding license for the model and/or training set. The interface may include a plurality of available security requirements or restrictions that can be implemented for the license.

At operation 404, security requirements are received from the creator. These security requirements may be received via the interface presented in operation 402 in examples where such an interface is presented. In other examples, the security requirements are received in a different communication form, such as a listing of requirements set forth according to schema that is understood by the licensing server 112. At operation 406, the decryption key for the training set and/or the model is received. At operation 408, a license package is generated. The license package includes the license defining the security requirements and the decryption key.

At operation 410, a license request is received for an encrypted model and/or training set that has been stored on a client device (or is being requested to be stored on the client device). At operation 412, device-level data is received for the client device requesting the license. In some examples, the device-level data is received with the license request received in operation 410. At operation 414, in some examples, user-level data is also received. For instance, when the security requirements of the license also include user-level requirements, the user-level data is received in operation 414. The user-level data may include an authentication verification of the user from an account server 114.

The security requirements of the license are then attempted to be verified at operation 416. For instance, the details received in operations 412-414 are compared to the security requirements of the license. Based on the comparison, the security requirements can either be verified (resulting in grant of the license) or cannot be verified (resulting in a denial of the license).

If the security requirements of the license cannot be verified at operation 416, then the method 400 flows to operation 418 where a denial notification is transmitted to the requesting client device. The denial notification indicates that the request for the license has been denied. In some examples, the denial notification will also provide the reasons why the denial occurred, such as which of the security requirements were not met. If, at operation 416, the security requirements are verified, the method flows to operation 420, where the license package is delivered to the requesting client device.

At a later point in time, the retransmission of the security details (e.g., device-level data and/or user-level data) is requested at operation 422. For instance, at an interval period of time, the licensing server 112 may need to re-verify that the client device and/or user continue to meet the security requirements. At operation 424, the updated security details are received from the client device. In some examples, instead of a request for updated security details being sent, the client device may send the updated security details without first receiving a request. For instance, the license may include an expiration clause that causes the license to expire after a set period of time (e.g., day, week, month). Prior to expiration, the client device needs to request a new updated license package from the license server. This new request includes the updated security data.

Once of the updated security data is received, the method 400 returns to operation 416 where the security requirements are attempted to be re-verified based on the updated security data. If the security requirements can be re-verified, the method again flows to operation 420 where the license is renewed and/or an updated license is transmitted to the client device.

Figure 5:
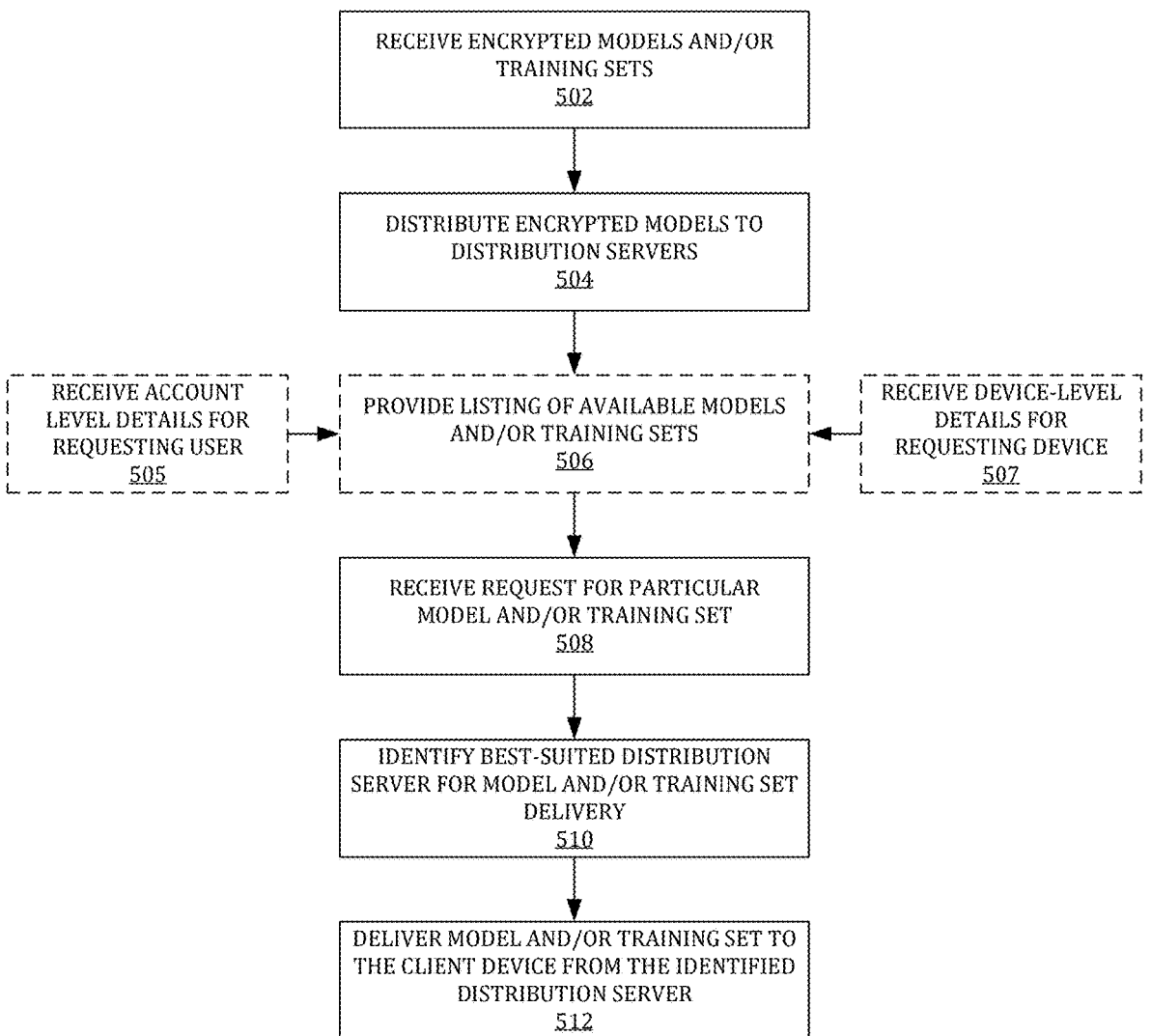
FIG. 5 depicts another example method for verifying device security and providing an AI-model license package.

FIG. 5 depicts an example method 500 for verifying device security and providing an AI-model license package. The method in example 500 may be performed by one or more of the devices or components of the systems described above. In an example, the method 500 is performed by the centralized server system 108 and one or more of the distributed servers 110.

At operation 502, multiple encrypted models and/or training sets are received from one or more creators. There may be a wide variety of models and/or training sets that are received. The variety of models and/or training sets provides for matching to the capabilities and/or needs of the different types of client devices.

In some examples, the models are precompiled for a specific platform. Once precompiled, the resulting code and data are encrypted. Such precompiling may occur on the model creation server, the centralized server, and/or one of the distribution servers. In such cases, the server performing the compilation needs a copy of the compilation environment to target a hardware platform.

At operation 504, the encrypted models are distributed (e.g., transmitted) to a plurality of distribution servers. The encrypted models may be distributed to all distribution servers available and/or a subset thereof.

At operation 506, in some examples, a listing of available models is provided. The listing may be provided in the form of a user interface or via other mechanisms. Details of the models may be similarly included with the listing of each of the available models and/or training sets.

In some examples, the listing of available models is customized for a particular user and/or client device for which the listing is being provided. For instance, the listing of available models may be based on the user and an account for the user. In such examples, account level details are received for a requesting user. The account level details indicate the models to which the user's account is allowed to have access. This may be based on an account tier or package. For example, a high-level account or tier may have access to higher resolution models than a lower-level account.

Additionally or alternatively, the listing of available models may be customized based on the capabilities of the client device for which the listing is being provided. In such examples, device-level data for the requesting device are received in operation 507. The device-level data may include types of processing and memory hardware (e.g., CPUs, NPUs, GPUs), included on the client device. The device-level data may also include the performance and/or capacity ratings of such hardware. Then, the listing of models may be selected for models that can be stored on the client device and executed on the device (e.g., the client device is capable of storing and using the models).

At operation 508, a request for a particular model and/or training set is received from a client device. In the examples where the listing of models and/or training sets are provided, the request may be received as a selection of the model provided in the list.

At operation 510, a best-suited distribution server, from among the distribution servers that have a copy of the model and/or training set, for delivering the model and/or training set is identified. Identification of the distribution server may be based on the proximity of the distribution server to the client device. As discussed above, the best-suited distribution server may be the server that is closest to the client device (e.g., based on a network map, latency, or geography).

At operation 512, the requested model and/or training set is delivered to the requesting client device from the identified distribution server. For instance, the client device downloads the model and/or training set from the identified distribution server.

Figure 6:
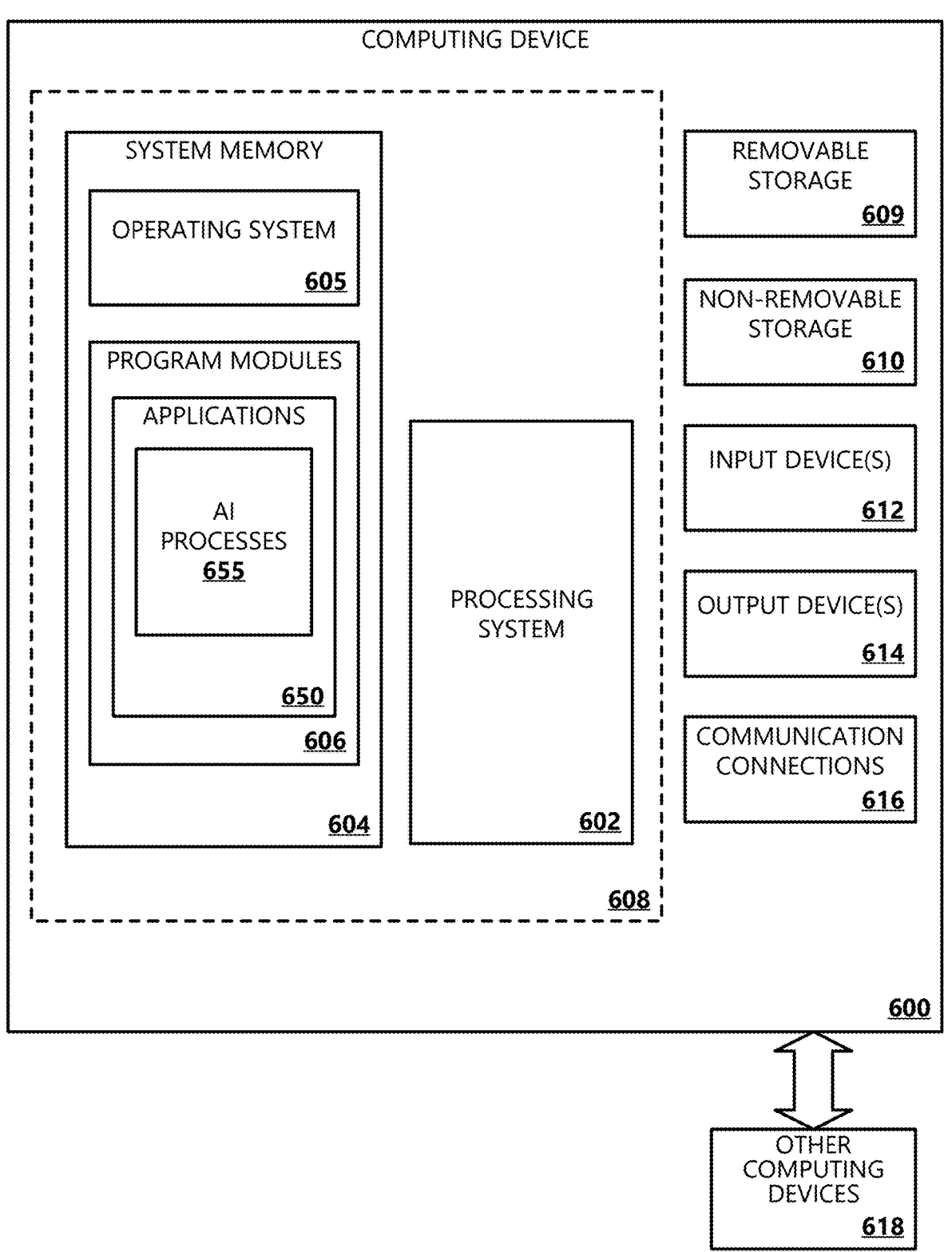
FIG. 6 is a block diagram illustrating example physical components of a computing device with which aspects of the technology may be practiced.

FIG. 6 and the associated description provide a discussion of a variety of operating environments in which examples of the invention may be practiced. However, the devices and systems illustrated and discussed with respect to FIG. 6 is for purposes of example and illustration and is not limiting of a vast number of computing device configurations that may be utilized for practicing aspects of the invention, described herein. FIG. 6 is a block diagram illustrating physical components (i.e., hardware) of a computing device 600 with which examples of the present disclosure may be practiced. The computing device components described below may be suitable for a client device running the web browser discussed above. In a basic configuration, the computing device 600 may include a processing system 602 including at least one processing unit and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 650. The software applications 650 may be any of the applications and/or processes discussed herein for handling the distribution and execution of the AI models and/or training sets discussed herein. Such applications and processes may be referred to collectively as AI processes 655.

The operating system 605, for example, may be suitable for controlling the operation of the computing device 600. Furthermore, aspects of the invention may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing system 602, the program modules 606 may perform processes including, but not limited to, one or more of the operations of the methods and/or data flows illustrated in the Figures. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 600 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 600 may also have one or more input device(s) 612 such as a keyboard, a mouse, a pen, a sound input device, a touch input device, etc. The output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. A system for controlling decryption key access, comprising:
   one or more processors; and
   a memory storing instructions, that when executed by the one or more processors, cause the system to perform operations comprising:
      receive a license request from a client device, the license request is for a license for local use of an artificial intelligence (AI) model;
      receive device-level data from the client device;
      compare security requirements included in a license for the model to the device-level data; and
      based on the comparison of the security requirements and the device-level data, transmitting, to the client device, a license package for the model, wherein the license package includes a decryption key to decrypt the model on the client device and the license for the model.

2. The system of claim 1, wherein the security requirements include at least one device-level restriction.

3. The system of claim 2, wherein the device-level restriction is based on a manufacturer of the client device.

4. The system of claim 2, wherein the device-level restriction is based on particular hardware installed on the client device.

5. The system of claim 2, wherein the device-level restriction is an organization-based restriction, and the device-level data from the client device indicates an organization to which the device belongs.

6. The system of claim 2, wherein the device-level restriction is based on software capabilities of the client device.

7. The system of claim 4, wherein the particular hardware includes at least one of a neural processing unit, a graphics processing unit, or memory.

8. The system of claim 4, wherein the device-level restriction permits granting of the license only when the client device includes the particular hardware.

9. The system of claim 1, wherein the security requirements include at least one of user-level or account-level restrictions, and the operations further comprise:
   receive authentication data for a user of the client device.

10. The system of claim 1, wherein the device-level data is provided by a hardware root of trust (HROT) of the client device.

11. The system of claim 1, wherein the license includes performance restrictions to be enforced by an HROT of the client device.

12. The system of claim 11, wherein the performance restrictions include at least a resolution restriction.

13. The system of claim 1, wherein the license includes usage restrictions to be enforced by an HROT of the client device.

14. The system of claim 13, wherein the usage restrictions include at least one of: a usage count, a usage time, a usage credit, or a concurrent-use limit.

15. The system of claim 13, wherein the usage restrictions include restrictions on modification of the AI model.

16. The system of claim 1, wherein the operations further comprise:
   receiving, from a model creation server, the security requirements;
   incorporating the security requirements into the license;
   receiving, from model creation server, the decryption key for the model; and
   combining the license and the decryption key into the license package.

17. A computer-implemented method for controlling access to an AI model, the method comprising:
   receiving, by a PAI server from a PAI client, an instruction to set the encrypted AI model in a secure environment;
   storing the encrypted AI model in secure memory of the secure environment;
   receiving, by the PAI server from the PAI client, a generate license request (GLR) instruction;
   based on the GLR instruction, generating, by the PAI server, a license request;
   providing, by the PAI server, the license request to the PAI client;
   receiving, by the PAI server, a process license package request that includes a license package for the AI model received from a licensing server in response to the license request;
   based on the process license package request, performing, by the PAI server, verification of the license package and extraction of a decryption key for the AI model; and
   decrypting, by the PAI server, the AI model with the extracted decryption key.

18. The method of claim 17, wherein the PAI server is within a PAI container, and the PAI container is one of a secure process, an enclave, a virtual machine, or an isolated hardware protection environment.

19. The method of claim 17, wherein the PAI server includes a hardware root of trust (HROT) that provides at least a portion of the license request.

20. The method of claim 19, wherein the license package includes a license including security requirements, wherein the security requirements include at least one of performance restrictions or usage restrictions that are enforced by the HROT.

* * * * *